US009778882B2

(12) United States Patent
Aston et al.

(10) Patent No.: US 9,778,882 B2
(45) Date of Patent: Oct. 3, 2017

(54) DYNAMIC WRITE BALANCING IN A DATA STORAGE SYSTEM

(75) Inventors: Christopher J. Aston, Bucks (GB); Mark S. Laker, Hampshire (GB); Trevor E. Willis, Bucks (GB)

(73) Assignee: HITACHI DATA SYSTEMS ENGINEERING UK LIMITED, Berkshire (GB)

(*) Notice: Subject to any disclaimer, the term of this patent is extended or adjusted under 35 U.S.C. 154(b) by 941 days.

(21) Appl. No.: 12/164,745

(22) Filed: Jun. 30, 2008

(65) Prior Publication Data

US 2009/0327368 A1    Dec. 31, 2009

(51) Int. Cl.
*G06F 17/40* (2006.01)
*G06F 3/06* (2006.01)
*G06F 17/30* (2006.01)

(52) U.S. Cl.
CPC ............ *G06F 3/0665* (2013.01); *G06F 3/067* (2013.01); *G06F 3/0608* (2013.01); *G06F 3/0631* (2013.01); *G06F 3/0644* (2013.01); *G06F 17/30174* (2013.01)

(58) Field of Classification Search
CPC ......... G06F 17/30094; G06F 17/30067; G06F 17/30174
USPC ........................................................ 707/831
See application file for complete search history.

(56) References Cited

U.S. PATENT DOCUMENTS

| 4,992,935 A * | 2/1991 | Comerford et al. .......... 711/170 |
| 5,615,352 A | 3/1997 | Jacobson et al. ............. 395/441 |
| 5,784,699 A | 7/1998 | McMahon et al. ........... 711/171 |
| 5,809,516 A | 9/1998 | Ukai et al. .................... 711/114 |
| 5,870,764 A * | 2/1999 | Lo et al. ................. 707/999.203 |
| 5,956,745 A * | 9/1999 | Bradford et al. ............. 711/137 |
| 6,366,289 B1 * | 4/2002 | Johns ............................. 345/543 |
| 6,567,307 B1 * | 5/2003 | Estakhri ................... 365/185.11 |
| 6,687,687 B1 * | 2/2004 | Smadja .................. 707/999.202 |
| 7,631,155 B1 * | 12/2009 | Bono et al. ..................... 711/156 |
| 2003/0120885 A1 * | 6/2003 | Bonola .......................... 711/170 |
| 2004/0139273 A1 * | 7/2004 | Doucette et al. ............. 711/100 |

(Continued)

FOREIGN PATENT DOCUMENTS

| EP | 1818797 | 8/2007 | ............... G06F 3/06 |
| JP | 08-115173 | 5/1996 | ............... G06F 3/06 |

(Continued)

OTHER PUBLICATIONS

Henson et al., "Chunkfs: Using Divide-and-Conquer to Improve File System Reliability and Repair", 2006 ACM.*

(Continued)

*Primary Examiner* — Apu Mofiz
*Assistant Examiner* — Sheryl Holland
(74) *Attorney, Agent, or Firm* — Mattingly & Malur, PC (57) ABSTRACT

Available storage locations are identified by searching through a free blocks object non-sequentially. The free blocks object may be logically divided into sections, and the sections may be searched non-sequentially. Each section may be logically divided into a number of sub-sections, and the sub-sections of the various sections may be searched non-sequentially. A new section may be added to the free blocks object, and the added section may be searched until a predetermined threshold or condition is reached, at which point non-sequential searching may begin or resume.

28 Claims, 7 Drawing Sheets

(56) References Cited

U.S. PATENT DOCUMENTS

| | | | | |
|---|---|---|---|---|
| 2004/0168037 A1* | 8/2004 | Dearth et al. | ............... | 711/173 |
| 2004/0221120 A1* | 11/2004 | Abrashkevich et al. | ..... | 711/170 |
| 2005/0055526 A1* | 3/2005 | Challenger et al. | .......... | 711/170 |
| 2006/0085617 A1* | 4/2006 | Roberson et al. | ............ | 711/170 |
| 2007/0083482 A1* | 4/2007 | Rathi et al. | ....................... | 707/1 |
| 2007/0106865 A1 | 5/2007 | Moore et al. | ................ | 711/170 |
| 2007/0266037 A1* | 11/2007 | Terry et al. | .................. | 707/100 |
| 2008/0126734 A1 | 5/2008 | Murase | ........................ | 711/170 |

FOREIGN PATENT DOCUMENTS

| | | | | |
|---|---|---|---|---|
| JP | 08-185275 | 7/1996 | .............. | G06F 3/06 |
| JP | 08-320821 | 12/1996 | ............. | G06F 12/00 |

OTHER PUBLICATIONS

International Search Report—International Application No. PCT/US2009/048843, dated Sep. 7, 2009, together with the Written Opinion of the International Searching Authority, 10 pages.

Dr. Lorenz von Kurowski, Response to Communication pursuant to Rules 161(1) and 162 EPC for European Patent Application No. 09 774 183.9, dated Mar. 18, 2011, 3 pages.

* cited by examiner

|   | 0 | 1 | 2 | 3 | 4 | 5 | 6 | 7 |
|---|---|---|---|---|---|---|---|---|
| 0 | X | X | X | 0 | 0 | X | 0 | X |
| 1 | 0 | 0 | 0 | 0 | X | X | X | 0 |
| 2 | 0 | X | X | X | X | 0 | X | 0 |

DYNAMIC WRITE BALANCING IN A DATA STORAGE SYSTEM

CROSS-REFERENCE TO RELATED APPLICATIONS

This patent application may be related to one or more of the following United States patent applications, each of which is hereby incorporated herein by reference in its entirety:

U.S. patent application Ser. No. 12/164,730 entitled MULTI-WAY CHECKPOINTS IN A DATA STORAGE SYSTEM, filed on Jun. 30, 2008;

U.S. patent application Ser. No. 09/879,798 entitled Apparatus and Method for Hardware Implementation or Acceleration of Operating System Functions, which was filed Jun. 12, 2001, now U.S. Pat. No. 6,826,615;

U.S. patent application Ser. No. 10/889,158 entitled Apparatus and Method for Hardware Implementation or Acceleration of Operating System Functions, which was filed on Jul. 12, 2004;

U.S. patent application Ser. No. 10/286,015 entitled Apparatus and Method for Hardware-Based File System, which was filed on Nov. 1, 2002 in the name of Geoffrey S. Barrall et al.; and U.S. patent application Ser. No. 11/841,353 entitled Apparatus and Method for Hardware-Based File System, which was filed on Aug. 20, 2007 in the name of Geoffrey S. Barrall et al.

FIELD OF THE INVENTION

The present invention relates to data storage systems, and, more particularly, to dynamic write balancing in a data storage system.

BACKGROUND

In today's information age, data storage systems often manage filesystems that include huge amounts of storage space. It is common for filesystems to include many terabytes of storage space spread over multiple storage devices.

In a dynamic filesystem environment, blocks of storage space often get used, freed, and re-used over time as files are created, modified, and deleted. It is common for such filesystems to include mechanisms for identifying, freeing, and re-using blocks that are no longer being used by the filesystem. Traditional block re-use schemes, which search through the filesystem storage space sequentially in order to locate free blocks for re-use, can result in imbalanced write operations that in turn can impact filesystem performance.

SUMMARY OF THE INVENTION

In accordance with one aspect of the invention there is provided a method for distributing write operations in a data storage system having a plurality of successive storage locations. The method involves maintaining a free blocks object indicating availability for each of the plurality of successive storage locations and searching through the free blocks object non-sequentially in order to identify available storage locations for writing data to storage.

In accordance with another aspect of the invention there is provided apparatus for distributing write operations in a data storage system having a plurality of successive storage locations. The apparatus includes a memory and a storage processor configured to maintain in the memory a free blocks object indicating availability for each of the plurality of successive storage locations and search through the free blocks object non-sequentially in order to identify available storage locations for writing data to storage.

In various alternative embodiments, searching through the free blocks object non-sequentially may involve logically dividing the free blocks object into a plurality of successive sections and searching through the sections non-sequentially. Each of the sections may be associated with a distinct virtual storage construct (e.g., ranges, stripesets, spans, system drive, or other virtual storage construct), in which case searching through the sections non-sequentially may result in searching through the virtual storage constructs non-sequentially.

In further alternative embodiments, each section may be logically divided into number of sub-sections, in which case searching through the sections non-sequentially may involve searching through the sub-sections of the sections non-sequentially. The sections may be logically divided into equal numbers of sub-sections such that the sub-sections can be different sizes in different sections or may be logically divided into equal sized sub-sections such that different sections can have different numbers of sub-sections.

In still further alternative embodiments, upon addition of a new section to the free blocks object for indicating availability of a number of added storage locations, the method may involve proceeding to search through the added section until a predetermined threshold or condition is reached, after which the above-mentioned non-sequential searching may begin or resume.

In exemplary embodiments, the free blocks object is in the form of a bit map having at least one status indicator bit per storage location, although the free blocks lists may be maintained in other forms such as, for example, a linked list, table, or other data structure.

In the above-mentioned embodiments, the data storage system may include a plurality of storage devices (e.g., hard disks, solid-state storage, etc.), and such non-sequential searching may help to balance utilization of the storage devices.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

Figure 1:
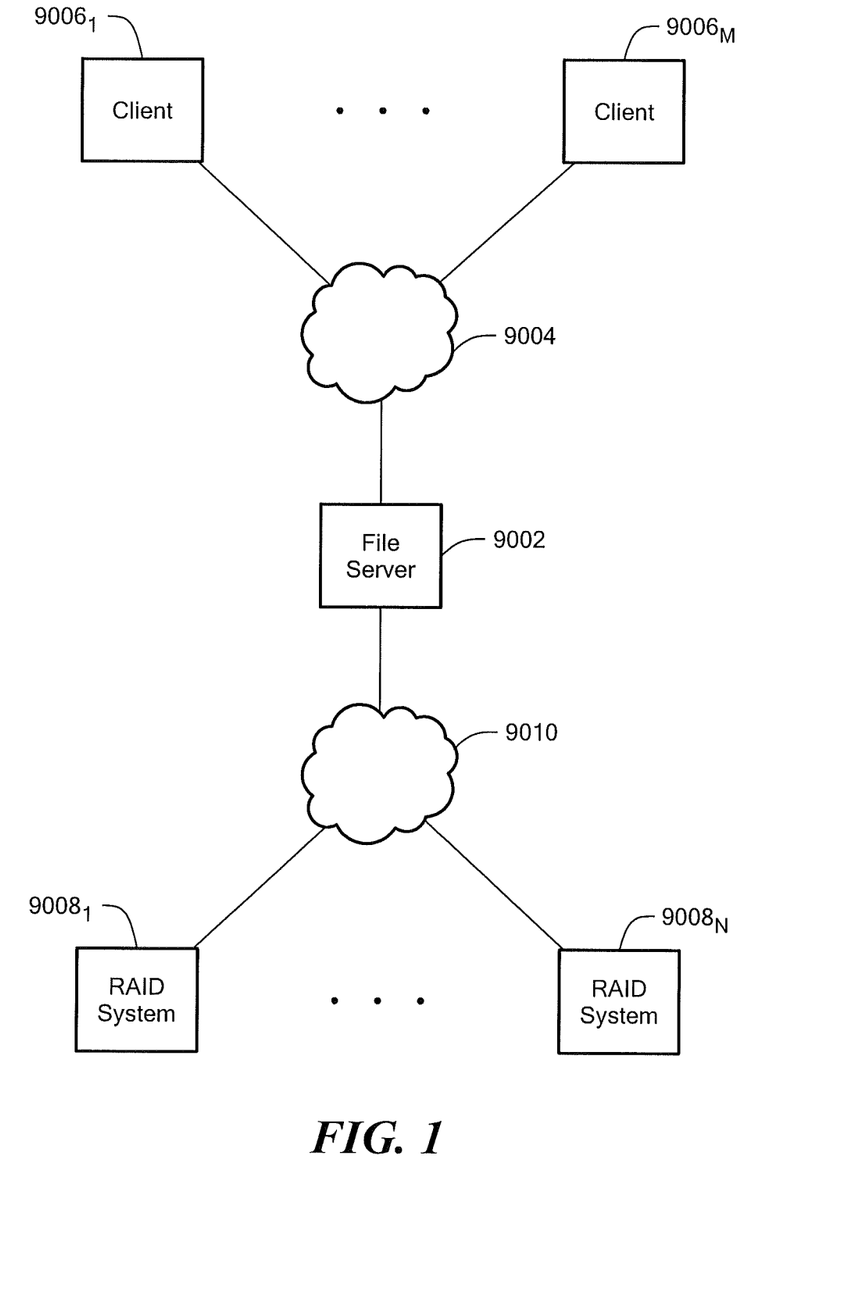
FIG. 1 is a schematic block diagram of a file storage system in accordance with an exemplary embodiment of the present invention.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 manages one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Figure 2:
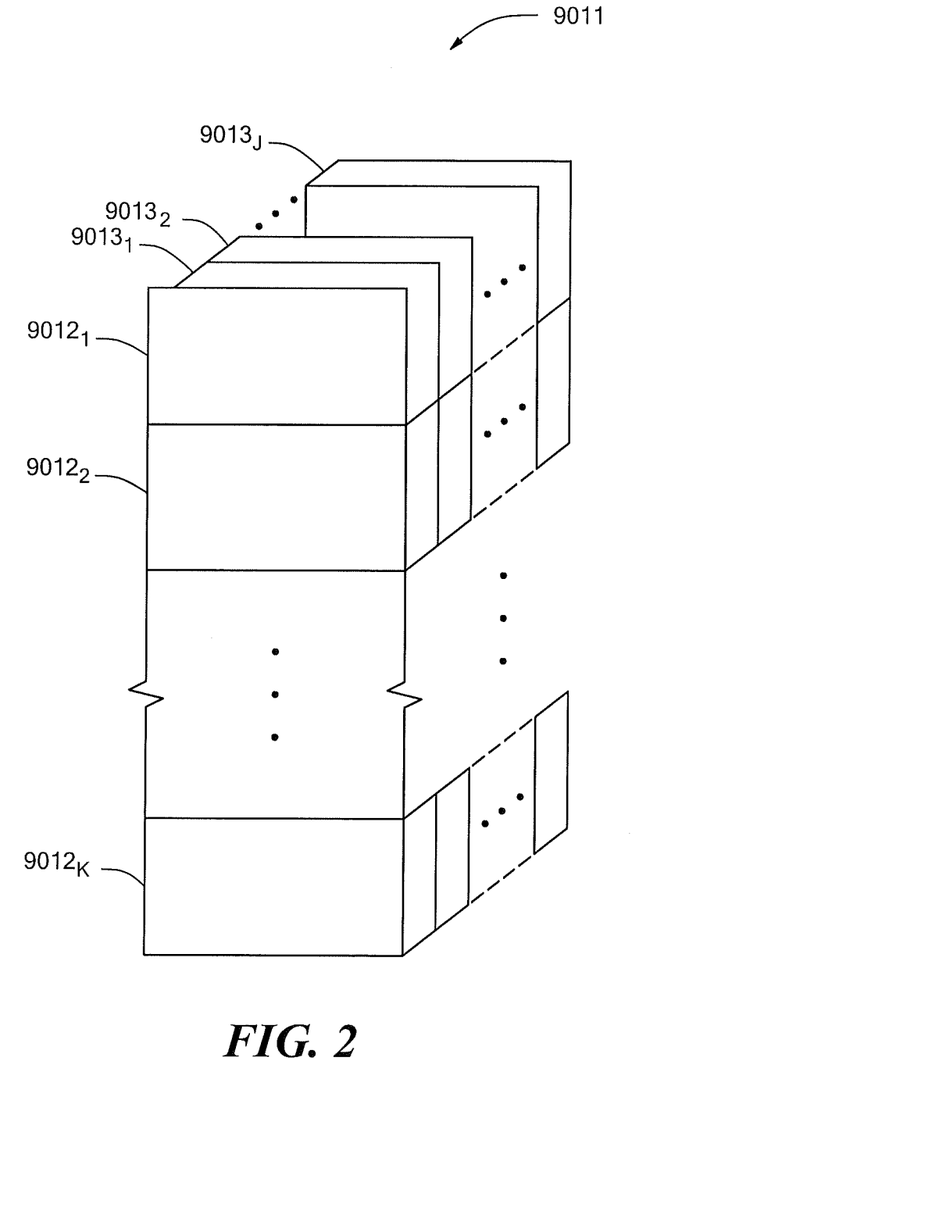
FIG. 2 is a schematic block diagram showing the general format of a filesystem in accordance with an exemplary embodiment of the present invention.

FIG. 2 is a schematic block diagram of a span in accordance with an exemplary embodiment of the present invention. As shown, the span 9011 is composed of a number of stripesets numbered $9012_1$-$9012_K$ that logically provide a contiguous storage space. Each stripeset 9012 in turn is composed of one or more ranges and therefore one or more SDs. In this example, stripeset $9012_1$ includes ranges numbered $9013_1$-$9013_J$.

When a large amount of data is written to a stripeset, the file server 9002 generally "stripes" the data across multiple ranges/SDs in the stripeset rather than writing all of the data to a single range/SD. For example, when a large amount of data is written, the file server 9002 may write the first 4 MB of data in range/SD $9013_1$, the next 4 MB of data in range/SD $9013_2$, and so on, recycling back to range/SD $9013_1$ after writing data to range/SD $9013_J$. Among other things, such "striping" increases the chances that the file server 9002 is using several SDs (and hence several storage devices), possibly managed by several RAID systems.

It should be noted that, in an exemplary embodiment, the span 9011 initially contains a single stripeset when the span is created, but additional stripesets may be added to the span over time, and different stripesets may have different numbers of ranges/SDs. In an exemplary embodiment, each stripeset can contain up to 32 SDs, regardless of their capacities. Each SD may be mirrored, but such mirroring is performed by the RAID systems rather than by the file server 9002; therefore, for mirrored SDs, the file server 9002 sends commands only to the primary SD, and only the primary SD counts towards the limit of 32 SDs per stripeset. Also, in an exemplary embodiment, once a stripeset is created, no more SDs are added to that stripeset. Therefore, in order to add SDs to the span, a new stripeset is formed for the additional SDs, and the new stripeset is essentially concatenated to the existing stripeset(s) in the span.

Thus, for example, a span initially may include a single stripeset having four SDs numbered 0-3. In order to add three new SDs numbered 5-7 to the span, a second stripeset including SDs 5-7 is created, and the second stripeset is concatenated to the first stripeset. The existing data is not "re-striped" across all seven SDs in the span.

In essence, a filesystem can be viewed as a contiguous storage space having N sequential blocks of storage. For the sake of this discussion, the blocks can be logically numbered sequentially from 0 to N-1. In actuality, the filesystem storage space may be physically non-contiguous within the span, and may include storage from multiple stripesets. Generally speaking, the file server 9002 maps filesystem storage blocks to physical storage locations within the span. Thus, in an exemplary embodiment in which a filesystem includes storage from multiple stripesets, a first set of filesystem storage blocks will map to a first stripeset, a second set of filesystem storage blocks will map to a second stripeset, and so on.

Figure 3:
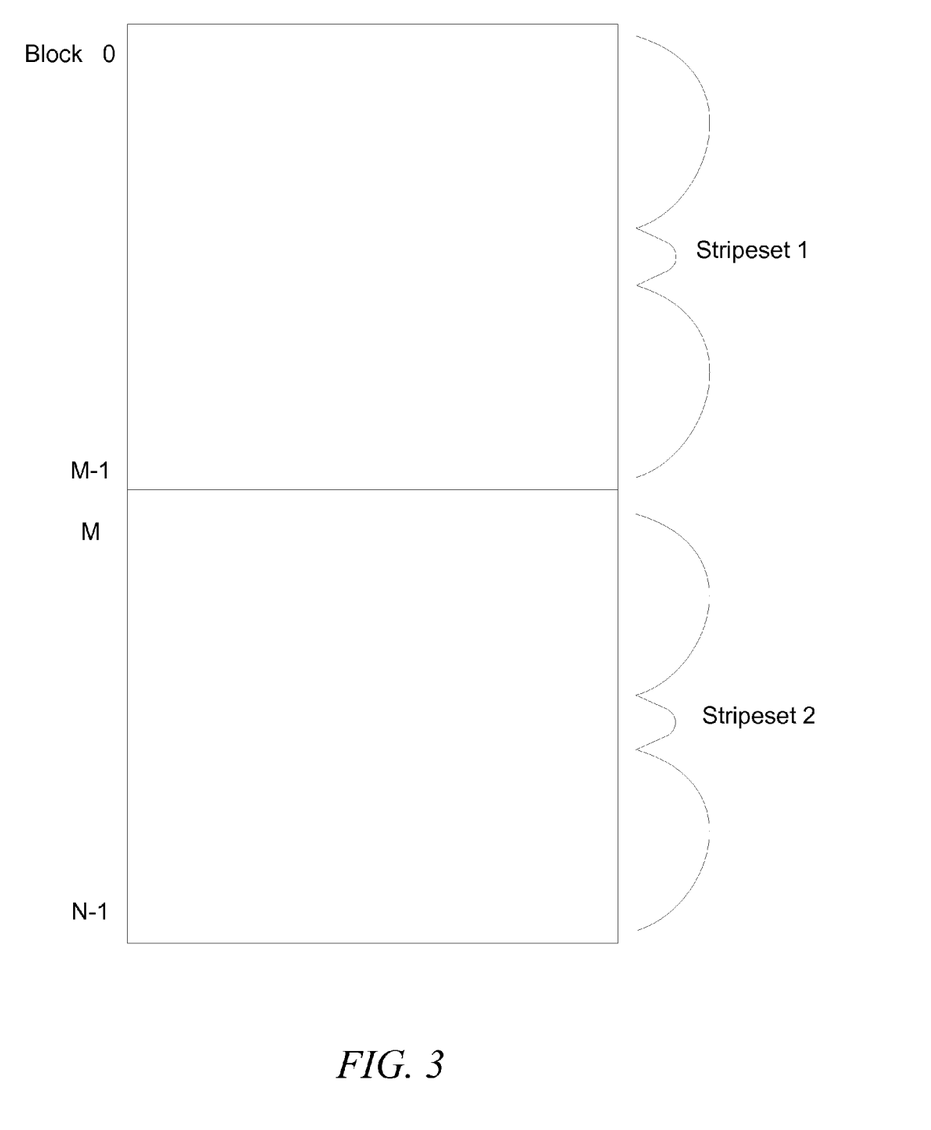
FIG. 3 is a schematic diagram showing the relationship between filesystem storage blocks and stripesets in an exemplary embodiment of the present invention.

FIG. 3 is a schematic diagram showing the relationship between filesystem storage blocks and stripesets in an exemplary embodiment of the present invention. In this example, there are N filesystem storage blocks and two stripesets, where the first M blocks (numbered 0 to M-1) map to stripeset 1 and the remaining N-M of the blocks (numbered M to N-1) map to stripeset 2. It should be noted that there may be many millions of blocks associated with each stripeset, and the number of blocks may be different in each stripeset.

In order to write data into storage for a filesystem, the file server 9002 needs to locate free storage blocks within the filesystem storage space for the data. Therefore, the file server 9002 typically maintains (e.g., in memory and/or on disk) a free blocks object that indicates, for each block, whether the block is free or used. In an exemplary embodiment, the free blocks object is in the form of a sequentially-ordered free block bit map having a two-bit status indicator per block to indicate whether the block is free or used (the two bits allow for representation of four states per block, with one of the states representing "free"). For the sake of this discussion, the status indicators in the free block bit map can be logically numbered from zero to N-1, where each status indicator is associated with the correspondingly numbered block. It should be noted, however, that the free blocks object could be in other forms, such as, for example, a linked list, table, or other data structure.

Figure 4:
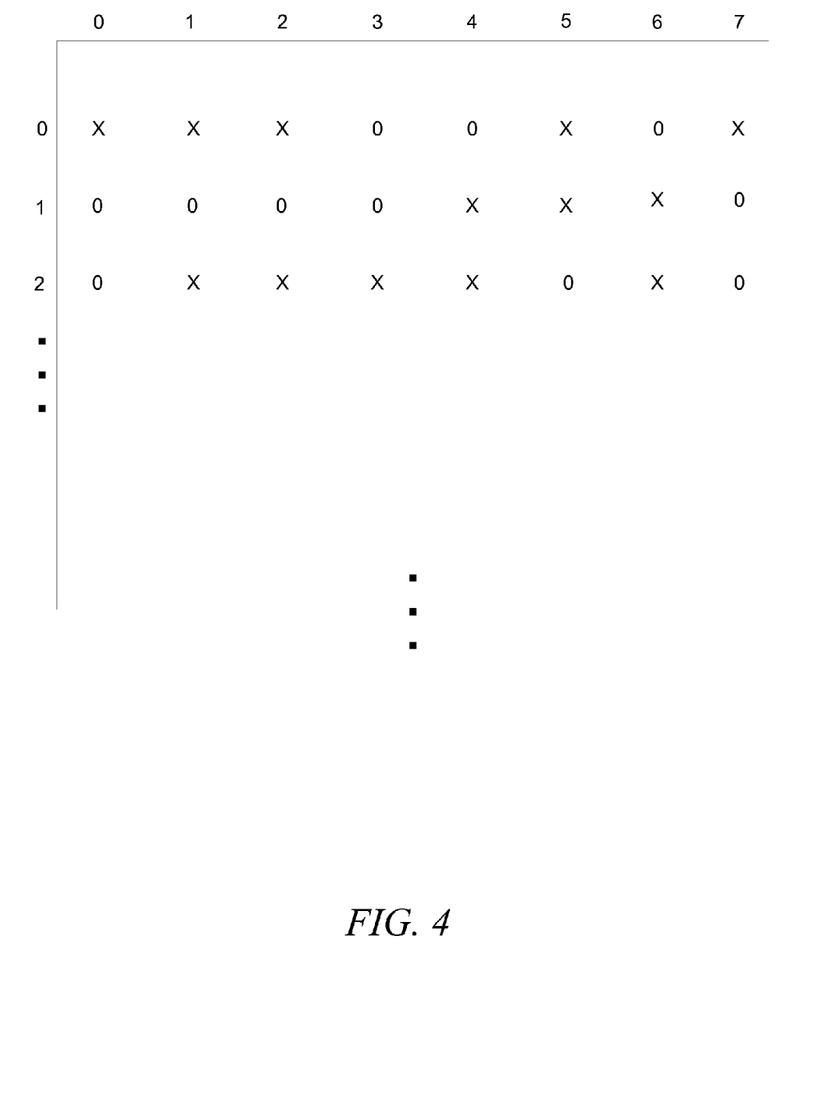
FIG. 4 is a schematic diagram of a free block bit map in accordance with an exemplary embodiment of the present invention.

FIG. 4 is a schematic diagram of a free block bit map in accordance with an exemplary embodiment of the present invention. In this example, an "X" status indicator represents a block that is in use and an "O" status indicator represents a block that is free. Row number 0 includes status indicators for blocks numbered 0-7, row number 1 includes status indicators for blocks numbered 8-15, and so on. Thus, in this example, block numbers 2, 4, 6, 8, 9, 10, 11, 15, 16, 21, and 23 are free.

Free storage blocks are typically located by sequentially stepping through the free blocks object looking for free blocks, circling back to the beginning of the free blocks object after the entire free blocks object has been searched. In an exemplary embodiment, for example, the file server 9002 may step through the free block bit map looking for status indicators that are marked "free" (indicating that the corresponding filesystem storage block is free). The file server 9002 typically maintains a write pointer in order to keep track of its position in the free block bit map.

Such sequential searching will now be described by example with reference again to FIG. 4. Assuming that the write pointer is at the beginning of the bit map (i.e., status indicator 0 of row 0) and the file server 9002 needs five free blocks, the file server 9002 would step sequentially through the bit map starting at status indicator 0 of row 0 until it locates five "free" status indicators. Thus, in this example, the file server 9002 would select the free blocks numbered 3, 4, 6, 8, and 9. The write pointer would be left at status indicator 2 of row 1 for a subsequent search operation.

If the filesystem includes storage from multiple stripesets, for example, as shown in FIG. 3, then the sequential searching described above can result in unbalanced writing patterns across the stripesets because the file server 9002 will search all of the filesystem storage blocks associated with one stripeset before looking for free blocks associated with another stripeset. Starting at the beginning of the bit map, for example, the file server 9002 will step through the status indicators associated with the first M blocks, which are associated with stripeset 1, before stepping through the status indicators associated with the remaining blocks, which are associated with stripeset 2. Because of the enormous amount of storage space in typical storage systems (i.e., many Terabytes), it may take a very long time (e.g., perhaps on the order of days) for the file server 9002 to step through the blocks associated with a particular stripeset. Using this sequential searching, a large amount of data (perhaps many Gigabytes) generally will be written to the blocks associated with one stripeset before data is written to the blocks associated with another stripeset. If a particular stripeset is slow (e.g., because it contains too few SDs or because RAID controllers used by that stripeset are overloaded), then write performance for the whole filesystem may be slow during the time that the file server 9002 is using free blocks associated with that stripeset, until the write pointer moves on to a different stripeset.

Therefore, in exemplary embodiments of the present invention, the file server 9002 searches through the free blocks object in a non-sequential manner in order to distribute write operations across the storage space (e.g., to help balance disk utilization). For example, the file server 9002 may logically divide the free blocks object into a number of sections and step through the sections non-sequentially, searching through a complete section before moving on to the next. In embodiments having multiple stripesets or similar constructs, where different portions of the of the free block object correspond to different stripesets, the file server 9002 may jump among the various stripesets, searching a section of the free blocks object corresponding to one stripeset before moving on to a section of the free blocks object corresponding to another stripeset (e.g., the file server 9002 may step through a section associated with one stripeset, then a section associated with the next stripeset, and so on) in order to spread write operations among the various stripesets.

Figure 5:
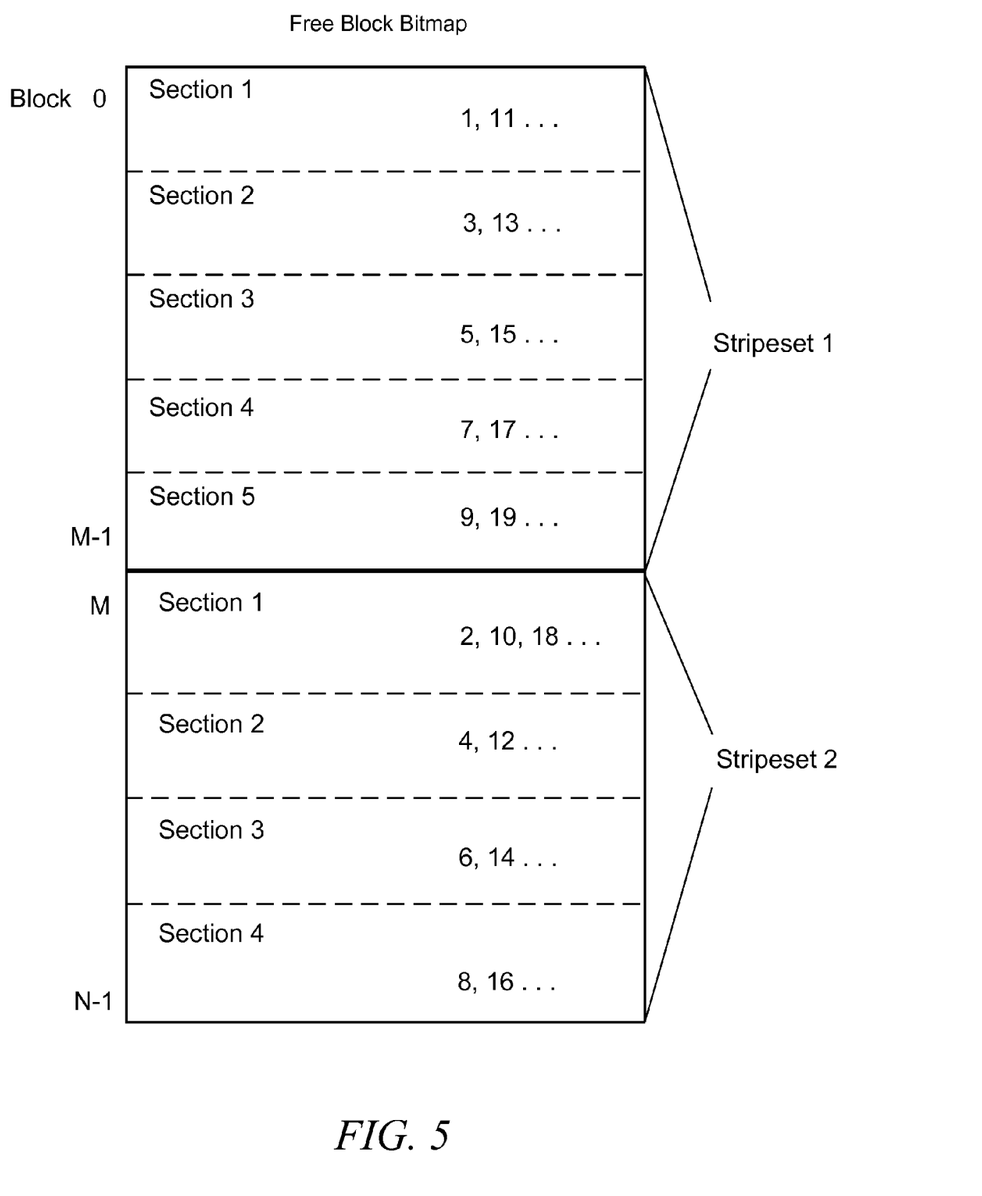
FIG. 5 is a schematic diagram depicting non-sequential searching for dynamic write balance in accordance with an exemplary embodiment of the present invention.

FIG. 5 is a schematic diagram depicting such non-sequential searching for dynamic write balancing in accordance with an exemplary embodiment of the present invention. In this example, the blocks associated with stripeset 1 are logically divided into five sections (numbered 1-5 here for convenience) while the blocks associated with stripeset 2 are logically divided into four sections (numbered 1-4 here for convenience). The stripesets may have different numbers of sections, for example, because the sections are a fixed size across the various stripesets and stripeset 2 happens to be ⅘ the size of stripeset 1 or because the two stripesets are the same size but there are other reasons to logically divide them into different numbers of sections.

The numbers shown in the sections indicate the order in which the sections are searched by the file server 9002 in this example. Specifically, starting at the beginning of the bit map, the file server 9002 first searches through section 1 of stripeset 1 (step 1), then searches through section 1 of stripeset 2 (step 2), then searches through section 2 of stripeset 1 (step 3), and so on. In this example, after the file server 9002 has searched through the last section of a stripeset, the file server 9002 cycles back to the first section of the stripeset to continue searching in that stripeset. This pattern can be seen in FIG. 5, for example, where, after searching through section 4 of stripeset 2 in step 8, the file server 9002 next searches in section 1 of stripeset 2 in step 10 (i.e., after searching through section 5 of stripeset 1 in step 9). It should be noted that the stripesets could be logically divided in different ways and could be searched in different patterns in various alternative embodiments. For example, the stripesets could be logically divided into equal numbers of sections even if the stripesets (and therefore the sections) are different sizes in different stripesets.

In order to support the non-sequential search for dynamic write balancing, for example, as just described, the file server 9002 typically maintains various types of information including, for example, the size of each stripeset, the starting offset of each stripeset within the filesystem space, and the amount of space that should be searched in a stripeset before moving to the next stripeset. The file server 9002 typically also maintains various pointers including, for example, a write pointer for each stripeset in order to maintain the search location in each stripeset and a global write pointer in order to maintain the current search location/stripeset.

It should be noted that various aspects of the embodiments described above may be used more generally in various alternative embodiments. For example, there is no requirement that the filesystem storage space be mapped to stripesets or other similar storage constructs. In certain embodiments, it may be desirable to use non-sequential searching through the filesystem storage space for other reasons.

Figure 6:
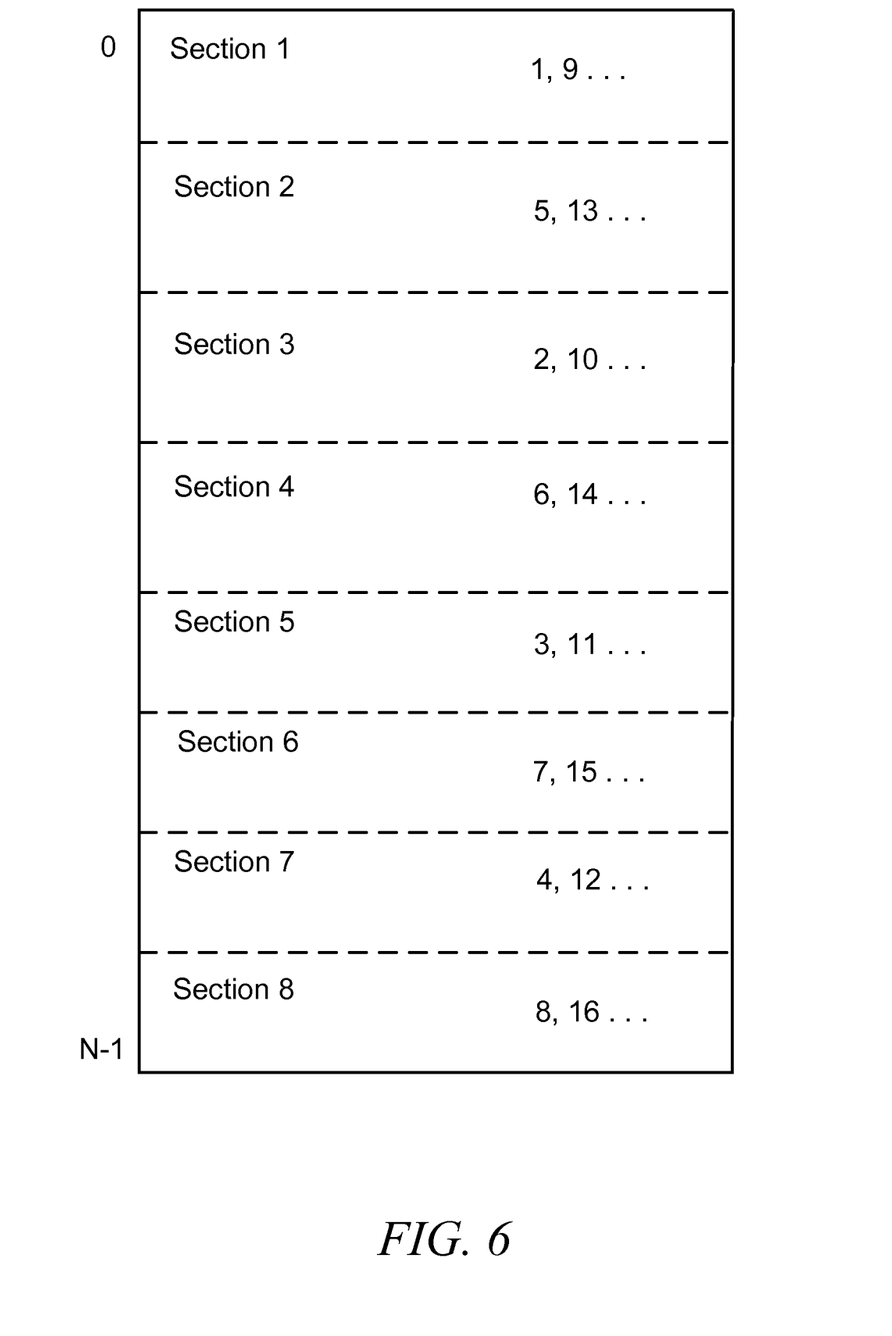
FIG. 6 is a schematic diagram depicting non-sequential searching that is independent of stripesets, in accordance with a first alternative embodiment of the present invention.

FIG. 6 is a schematic diagram depicting non-sequential searching that is independent of stripesets, in accordance with a first alternative embodiment of the present invention. In this example, the filesystem storage space is locally divided into eight sections (numbered 1-8 for convenience). The numbers shown in the sections indicate the order in which the sections are searched by the file server 9002 in this example. Specifically, starting at the beginning of the filesystem storage space, the file server 9002 first searches through section 1 (step 1), then searches through section 3 (step 2), then searches through section 5 (step 3), and so on.

Figure 7:
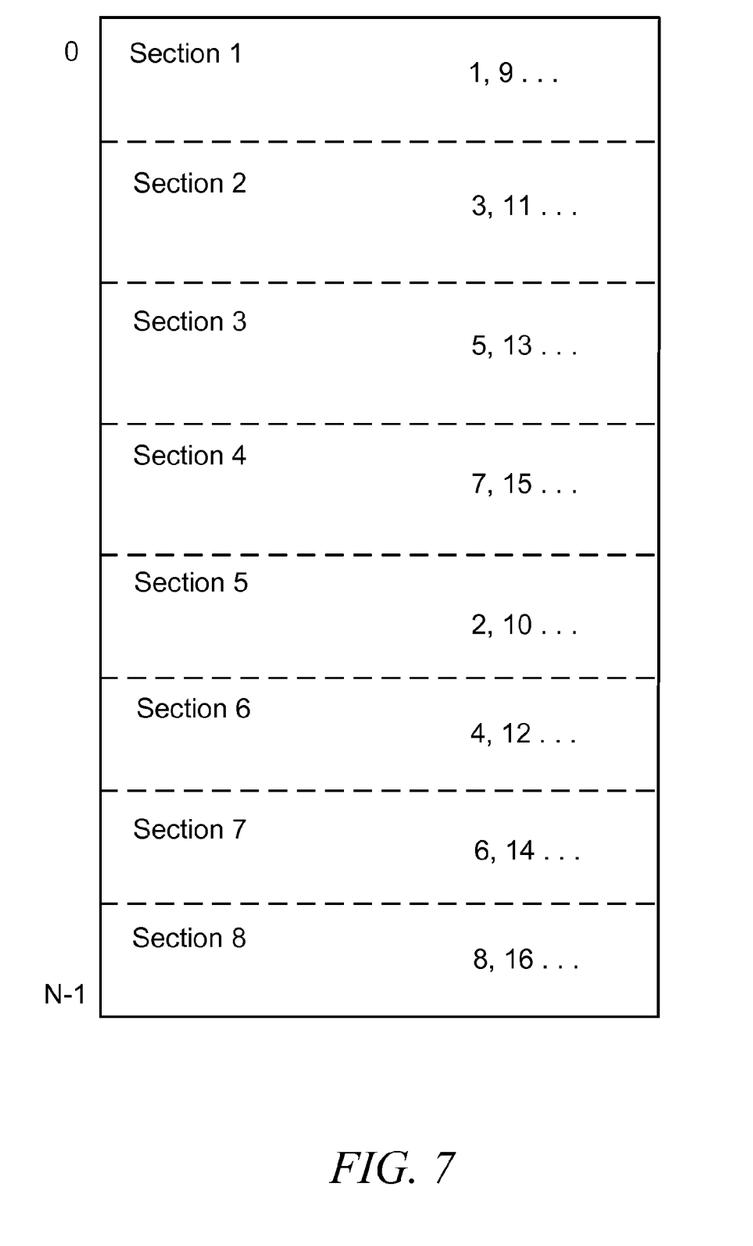
FIG. 7 is a schematic diagram depicting non-sequential searching that is independent of stripesets, in accordance with a second alternative embodiment of the present invention.

FIG. 7 is a schematic diagram depicting non-sequential searching that is independent of stripesets, in accordance with a second alternative embodiment of the present invention. In this example, the filesystem storage space is locally divided into eight sections (numbered 1 -8 for convenience). The numbers shown in the sections indicate the order in which the sections are searched by the file server 9002 in this example. Specifically, starting at the beginning of the filesystem storage space, the file server 9002 first searches through section 1 (step 1), then searches through section 5 (step 2), then searches through section 2 (step 3), and so on.

As discussed above, filesystem storage space may be expanded over time by adding one or more new stripesets. When a new stripeset is added, the free blocks object is effectively expanded to include the new storage space provided by the stripeset (the free blocks object may or may not be physically expanded at the time the stripeset is added). In addition to searching through the free blocks object non-sequentially as discussed above, or alternatively to such non-sequential search, the file server 9002 may be configured to begin using free blocks from the newly added stripeset when the new stripeset added. One reason for using free blocks from the newly added stripeset is that the newly added stripeset is typically quite efficient initially. Thus, when the new stripeset is added, the file server 9002 may update the global write pointer to reference the newly added stripeset so that free blocks are initially taken from the newly added stripeset. The file server 9002 may be configured so as to take free blocks from the newly added stripeset until some predetermined threshold or condition is reached, at which time the file server 9002 may begin or resume non-sequential searching of the free blocks object.

Thus, in an exemplary embodiment, a storage server may include a memory and a storage processor that is configured to maintain in the memory a free blocks object indicating availability for each of a plurality of successive storage locations and search through the free blocks object non-sequentially in order to identify available storage locations for writing data to storage.

It should be noted that, in an exemplary embodiment, the file server maintains the free blocks object on disk along with other system objects but copies the free blocks object into working memory when needed (i.e., it is cached in memory) and searches for free blocks using the cached copy of the free blocks object.

It should be noted that the term "server" is used herein to describe a device that may be used in a communication system and should not be construed to limit the present invention to any particular type of device. Thus, embodiments of the present invention may be implemented in a client, server, computer, switch, or other type of communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in an appropriate programming language (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for distributing write operations in a data storage system comprising a plurality of storage devices and having a plurality of successive storage blocks of storage space being spread over the plurality of storage devices in a plurality of stripesets, the method comprising:

logically dividing each stripeset into a plurality of sections of storage blocks;

creating a free block data structure corresponding to each of the plurality of sections of each stripeset using a plurality of status indicators, each status indicator being associated with a respective storage block and indicating whether the respective storage block is free or used;

identifying free storage blocks available for writing data by non-sequentially searching through the free block data structure by referring to the status indicators of the free block data structure in order to identify free storage blocks being available for writing data: the non-sequentially searching through the free block data structure comprising: (1) searching through the free block data structure corresponding to a first section of a first stripeset to identify free storage blocks in the first section of the first stripeset, (2) before searching through the free block data structure corresponding to any other section of the first stripeset, searching through the free block data structure corresponding to a second section of a second stripeset to identify storage blocks in the second section of the second stripeset, and (3) thereafter searching through the free block data structure corresponding to another section of the first stripeset; and controlling writing to the identified free storage blocks by distributing the writing over the first and second stripesets based on the non-sequential searching through the free block data structure.

2. A method according to claim 1, wherein
the plurality of stripesets are logically divided as successive sequentially-ordered stripesets; and
searching through the free block data structure in order to identify free storage blocks includes searching through the sequentially-ordered stripesets non-sequentially.

3. A method according to claim 2, wherein
each of the sequentially-ordered stripesets is associated with a distinct virtual storage construct, and wherein searching through the sequentially-ordered stripesets non-sequentially results in searching through the virtual storage constructs non-sequentially.

4. A method according to claim 3, wherein
the virtual storage constructs further include at least one of:
ranges;
spans; and
system drives.

5. A method according to claim 1, wherein
each section is searched through completely before moving on to searching through another section.

6. A method according to claim 1, wherein
the stripesets are logically divided into equal numbers of sections; or
the stripesets are logically divided into equal sized sections.

7. A method according to claim 1, further comprising:
proceeding, upon addition of a new stripeset for indicating availability of a number of added storage blocks, to search through a section of the added stripeset until a predetermined threshold or condition is reached.

8. A method according to claim 1, wherein
the free block data structure is maintained as a free blocks object; or
the free block data structure includes a bit map having one or more status indicator bits per storage block.

9. A method according to claim 1, wherein
controlling writing to the identified free storage blocks includes distributing write operations across the storage space of the plural storage devices based on the searching through the free block data structure.

10. An apparatus for distributing write operations in a data storage system comprising a plurality of storage devices and having a plurality of successive storage blocks of storage space being spread over the plurality of storage devices in a plurality of stripesets, the apparatus comprising:
a memory; and
a storage processor configured to:
logically divide each stripeset into a plurality of sections of storage blocks;
creating a free block data structure corresponding to each of the plurality of sections of each stripeset using a plurality of status indicators, each status indicator being associated with a respective storage block and indicating whether the respective storage block is free or used,
identifying free storage blocks available for writing data by non-sequentiali searching through the free block data structure by referring to the status indicators of the free block data structure in order to identify free storage blocks being available for writing data, the non-sequentially searching through the free block data structure comprising: (1) searching through the free block data structure corresponding to a first section of a first stripeset to identify free storage blocks in the first section of the first stripeset, (2) before searching through the free block data structure corresponding to any other section of the first stripeset, searching through the free block data structure corresponding to a second section of a second stripeset to identify storage blocks in the second section of the second stripeset, and (3) thereafter searching through the free block data structure corresponding to another section of the first stripeset; and controlling writing to the identified free storage blocks by distributing the writing over the first and second stripesets based on the non-sequential searching through the free block data structure.

11. An apparatus according to claim 10, wherein
the storage processor is configured to logically divide the plurality of stripesets as successive sequentially-ordered stripesets and the storage processor is configured to search through the sequentially-ordered stripesets non-sequentially.

12. An apparatus according to claim 11, wherein
each of the sequentially-ordered stripesets is associated with a distinct virtual storage construct, and wherein such searching through the sequentially-ordered stripesets non-sequentially results in searching through the virtual storage constructs non-sequentially.

13. An apparatus according to claim 12, wherein
the virtual storage constructs include at least one of:
ranges;
spans; and
system drives.

14. An apparatus according to claim 10, wherein
each section is searched through completely before moving on to searching through another section.

15. An apparatus according to claim 10, wherein
the stripesets are logically divided into equal numbers of sections; or
the stripesets are logically divided into equal sized sections.

16. An apparatus according to claim 11, wherein
the storage processor is further configured to add a new stripeset of plural status indicators for indicating availability of a number of added storage blocks and proceed, upon addition of the new stripeset, to search through a section of the added stripeset until a predetermined threshold or condition is reached.

17. An apparatus according to claim 10, wherein
the free block data structure is maintained as a free blocks object; or
the free block data structure includes a bit map having one or more status indicator bits per storage block.

18. An apparatus according to claim 10, wherein
controlling writing to the identified free storage blocks includes distributing write operations across storage spaces of the plural storage devices based on the searching through the free block data structure.

19. A data storage system comprising:
a plurality of storage devices having a plurality of successive storage blocks of the storage space being spread over the plural storage devices in a plurality of stripesets; and an apparatus for distributing write operations in the data storage, the apparatus comprising:

a memory; and a storage processor configured to:

logically divide each stripeset into a plurality of sections of storage blocks;

create a free block data structure corresponding to each of the plurality of sections of each stripeset using of a plurality of status indicators, each status indicator being associated with a respective storage block and indicating whether the respective storage block is free or used, identify free storage blocks available for writing data by non-sequentially searching through the free block data structure by referring to the status indicators of the free block data structure in order to identify free storage blocks being available for writing data, the non-sequentially searching through the free block data structure comprising: (1) searching through the free block data structure corresponding to a first section of a first stripeset to identify free storage blocks in the first section of the first stripeset, (2) before searching through the free block data structure corresponding to any other section of the first stripeset, searching through the free block data structure corresponding to a second section of a second stripeset to identify storage blocks in the second section of the second stripeset, and (3) thereafter searching through the free block data structure corresponding to another section of the first stripeset; and control writing to the identified free storage blocks by distributing the writing over the first and second stripesets based on the non-sequential searching through the free block data structure.

20. A computer program product comprising a tangible, non-transitory computer readable medium storing program instructions which, when being executed by a computer, cause the computer to control a method for distributing write operations in a data storage system comprising plural storage devices and having a plurality of successive storage blocks of storage space being spread over the plural storage devices in a plurality of stripesets, in which the computer executes:

logically dividing each stripeset into a plurality of sections of storage blocks;

creating a free block data structure corresponding to each of the plurality of sections of each stripeset using a plurality of status indicators, each status indicator being associated with a respective storage block and indicating whether the respective storage block is free or used;

identifying free storage blocks available for writing data by non-sequentially searching through the free block data structure by referring to the status indicators of the free block data structure in order to identify free storage blocks being available for writing data; the non-sequentially searching through the free block data structure comprising: (1) searching through the free block data structure corresponding to a first section of a first stripeset to identify free storage blocks in the first section of the first stripeset, (2) before searching through the free block data structure corresponding to any other section of the first stripeset, searching through the free block data structure corresponding to a second section of a second stripeset to identify storage blocks in the second section of the second stripeset, and (3) thereafter searching through the free block data structure corresponding to another section of the first stripeset; and controlling writing to the identified free storage blocks by distributing the writing over the first and second stripesets based on the non-sequential searching through the free block data structure.

21. A computer program product according to claim 20, wherein the plurality of stripesets are logically divided as successive sequentially-ordered stripesets; and searching through the free block data structure includes searching through the sequentially-ordered stripesets non-sequentially.

22. A computer program product according to claim 21, wherein each of the sequentially-ordered stripesets is associated with a distinct virtual storage construct, and wherein searching through the sequentially-ordered stripesets non-sequentially results in searching through the virtual storage constructs non-sequentially.

23. A computer program product according to claim 22, wherein the virtual storage constructs include at least one of:

ranges;

spans; and system drives.

24. A computer program product according to claim 20, wherein each section is searched through completely before moving on to searching through another section.

25. A computer program product according to claim 20, wherein the stripesets are logically divided into equal numbers of sections; or the stripesets are logically divided into equal sized sections.

26. A computer program product according to claim 20, further comprising:

proceeding, upon addition of a new stripeset of plural status indicators for indicating availability of a number of added storage blocks, to search through a section of the added stripeset until a predetermined threshold or condition is reached.

27. A computer program product according to claim 20, wherein the free block data structure is maintained as a free blocks object; or the free block data structure includes a bit map having one or more status indicator bits per storage block.

28. A computer program product according to claim 20, wherein controlling writing to the identified free storage blocks includes distributing write operations across the storage space of the plural storage devices based on the searching through the free block data structure.

* * * * *